US011022756B2

(12) United States Patent
Wang et al.

(10) Patent No.: US 11,022,756 B2
(45) Date of Patent: Jun. 1, 2021

(54) METHOD AND SYSTEM FOR NEAR NORMAL INCIDENCE MUX/DEMUX DESIGNS

(71) Applicant: Luxtera LLC., Wilmington, DE (US)

(72) Inventors: Shawn Wang, Vista, CA (US); Subal Sahni, La Jolla, CA (US); Gianlorenzo Masini, Carlsbad, CA (US)

(73) Assignee: Luxtera LLC, Wilmington, DE (US)

( * ) Notice: Subject to any disclaimer, the term of this patent is extended or adjusted under 35 U.S.C. 154(b) by 0 days.

(21) Appl. No.: 16/159,174

(22) Filed: Oct. 12, 2018

(65) Prior Publication Data
US 2019/0113687 A1 Apr. 18, 2019

Related U.S. Application Data

(60) Provisional application No. 62/571,567, filed on Oct. 12, 2017.

(51) Int. Cl.
G02B 6/293 (2006.01)
G02B 6/30 (2006.01)
G02B 6/32 (2006.01)

(52) U.S. Cl.
CPC ....... G02B 6/29367 (2013.01); G02B 6/2938 (2013.01); G02B 6/30 (2013.01); G02B 6/32 (2013.01)

(58) Field of Classification Search
CPC .................................. G02B 6/29367
See application file for complete search history.

(56) References Cited

U.S. PATENT DOCUMENTS 6,198,864 B1 * 3/2001 Lemoff .............. G02B 6/29367
385/24
6,201,908 B1 * 3/2001 Grann ................ G02B 6/29358
385/24

(Continued)

FOREIGN PATENT DOCUMENTS

WO WO-2016122678 A1 * 8/2016 ........... G02B 6/4286

OTHER PUBLICATIONS

Notification of Transmittal of The International Search Report And The Written Opinion of the International Searching Authority, or the Declaration, for International PCT Application No. PCT/US2018/055681, International Filing Date Oct. 12, 2018, dated Jan. 8, 2019.

(Continued)

Primary Examiner — Rhonda S Peace
(74) Attorney, Agent, or Firm — Patterson + Sheridan, LLP

(57) ABSTRACT

Near normal incidence MUX/DEMUX designs may include an optical demultiplexer coupled to a photonics die, where the optical demultiplexer comprises an input fiber, thin film filters at a first surface of a substrate, a first mirror at the first surface of the substrate, and a second mirror at a second surface of the substrate. The optical demultiplexer may receive an input optical signal comprising a plurality of wavelength optical signals, reflect the input optical signal from the first mirror to the second mirror, reflect the input optical signal from the second mirror to a first of the thin film filters, communicate an optical signal at a first wavelength to the photonics die while reflecting others to the second mirror, reflect the other signals to a second of the plurality of thin film filters, and communicate an optical signal at a second wavelength to the photonics die.

22 Claims, 5 Drawing Sheets

(56) References Cited

U.S. PATENT DOCUMENTS

| | | | | |
|---|---|---|---|---|
| 6,769,816 | B2* | 8/2004 | Capewell | G02B 6/29367 385/24 |
| 6,804,429 | B2* | 10/2004 | Yu | G01J 3/021 385/24 |
| 6,941,047 | B2* | 9/2005 | Capewell | G02B 6/29367 385/33 |
| 7,260,328 | B2* | 8/2007 | Kropp | G02B 6/29367 385/47 |
| 7,366,371 | B1* | 4/2008 | Wen | G02B 6/4214 385/15 |
| 8,380,075 | B2* | 2/2013 | Sakigawa | G02B 6/4201 398/128 |
| 8,540,437 | B2* | 9/2013 | Lee | G02B 6/4215 385/93 |
| 8,641,298 | B2* | 2/2014 | Lim | G02B 6/4246 385/14 |
| 8,913,858 | B2* | 12/2014 | Charbonneau-Lefort | G02B 6/4224 385/33 |
| 9,323,013 | B2* | 4/2016 | Shao | G02B 6/4246 |
| 9,435,963 | B2* | 9/2016 | Charbonneau-Lefort | G02B 6/4206 |
| 9,798,087 | B1* | 10/2017 | Mathai | G02B 6/29367 |
| 9,804,334 | B2* | 10/2017 | Israel | G02B 6/262 |
| 10,243,661 | B2* | 3/2019 | Sorin | H01S 5/026 |
| 10,281,651 | B2* | 5/2019 | Matres | G02B 6/29367 |
| 10,409,013 | B1* | 9/2019 | Lu | G02B 6/4214 |
| 2003/0002101 | A1* | 1/2003 | Kropp | G02B 6/29367 398/79 |
| 2005/0069013 | A1* | 3/2005 | Bhandarkar | G02B 6/4204 372/102 |
| 2006/0251422 | A1* | 11/2006 | Liu | G02B 6/4215 398/79 |
| 2008/0118243 | A1* | 5/2008 | Wen | G02B 6/4214 398/43 |
| 2013/0168537 | A1* | 7/2013 | Shin | G02B 6/4206 250/216 |
| 2016/0246008 | A1* | 8/2016 | Tan | G02B 6/29365 |
| 2016/0327746 | A1* | 11/2016 | Mathai | G02B 6/29367 |
| 2018/0017735 | A1* | 1/2018 | Miao | G02B 6/34 |
| 2018/0031768 | A1* | 2/2018 | Miyata | G02B 6/2938 |

OTHER PUBLICATIONS

PCT Notification Concerning Transmittal of International Prelimiarty Report on Patentability for Application No. PCT/US2018/055681, dated Apr. 23, 2020.

* cited by examiner

METHOD AND SYSTEM FOR NEAR NORMAL INCIDENCE MUX/DEMUX DESIGNS

CROSS-REFERENCE TO RELATED APPLICATIONS/INCORPORATION BY REFERENCE

This application claims priority to and the benefit of U.S. Provisional Application No. 62/571,567 filed on Oct. 12, 2017, which is hereby incorporated herein by reference in its entirety.

FIELD

Aspects of the present disclosure relate to electronic components. More specifically, certain implementations of the present disclosure relate to methods and systems for near normal incidence MUX/DEMUX designs.

BACKGROUND

Conventional approaches for multiplexing and demultiplexing may be costly, cumbersome, and/or inefficient—e.g., they may be complex and/or time consuming, and/or may have limited responsivity due to losses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for near normal incidence MUX/DEMUX designs, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1:
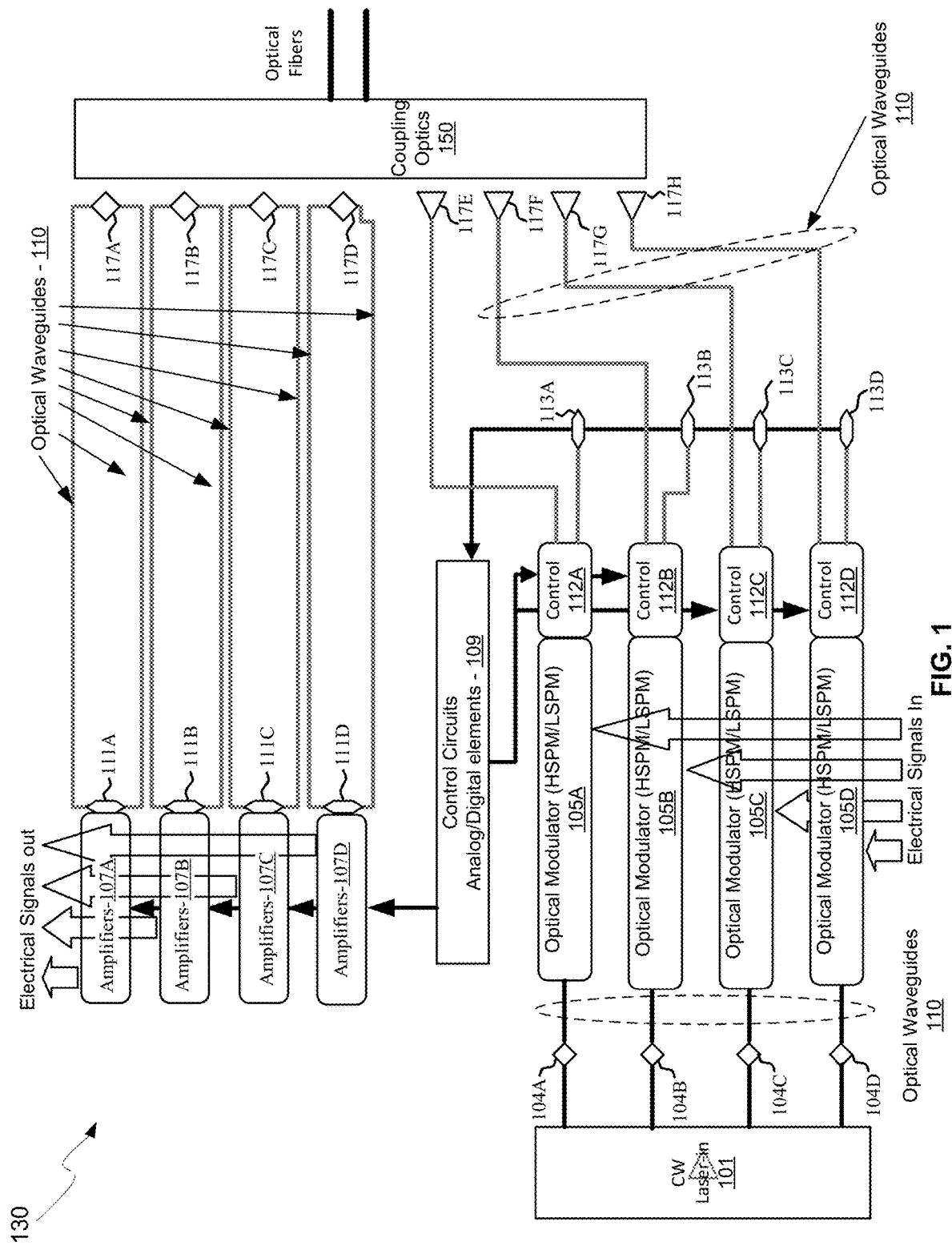
FIG. 1 is a block diagram of a photonically-enabled integrated circuit with polarization independent MUX/DEMUX, in accordance with an example embodiment of the disclosure.

FIG. 1 is a block diagram of a photonically-enabled integrated circuit with near normal incidence multiplexers/demultiplexers, in accordance with an example embodiment of the disclosure. Referring to FIG. 1, there are shown optoelectronic devices on a photonically-enabled integrated circuit 130 comprising optical modulators 105A-105D, photodiodes 111A-111D, monitor photodiodes 113A-113D, and optical devices comprising couplers 104A-104D and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more continuous-wave (CW) optical signals to the coupler 104A. The CW optical signals may be at different wavelengths for CWDM operation, such as CWDM4, for example. The photonically enabled integrated circuit 130 may comprise a single chip, or may be integrated on a plurality of die, such as with one or more electronics die and one or more photonics die.

The grating couplers 104A-104D comprise grating structures with grating spacing and width configured to couple optical signals of a specific wavelength and polarization into the IC 130. A lens array may be incorporated between the grating couplers 104A-104D and the laser assembly 101 for focusing of the optical signals to the grating couplers for increased coupling efficiency.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized, as shown for grating couplers 117A-117D, although these may instead be SPGCs.

The optical fibers may be coupled to the CMOS chip, using coupling optics 150 that selectively deflect optical signals of different wavelengths to and from different grating couplers on the chip 130, with each coupler, such as each of the grating couplers 117A-117H being configured to couple optical signals of different wavelengths. The coupling optics 150 are described further with respect to FIGS. 2-5.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the couplers 104A-104D. The optical modulators 105A-105D may require high-speed electrical signals to modulate the refractive index in respective branches of a Mach-Zehnder interferometer (MZI), for example.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

One example commercial application of silicon photonics is high speed optical transceivers, i.e., ICs that have optoelectronic transmission (Tx) and receiving (Rx) functionality integrated in the same chip. The input to such an IC is either a high speed electrical data-stream that is encoded onto the Tx outputs of the chip by modulating the light from a laser or an optical data-stream that is received by integrated photodetectors and converted into a suitable electrical signal by going through a Transimpedance Amplifier (TIA)/Limiting Amplifier (LA) chain. Such silicon photonics transceiver links have been successfully implemented at baud-rates in the tens of GHz.

One method for increasing data rates in optical transceivers is to multiplex a plurality of optical signals at different wavelengths for concurrent transmission through the optical fiber, which may then be demultiplexed at the receiving end. To this end, multiplexers and demultiplexers (MUX/DEMUX) may be utilized to combine/separate the different optical wavelengths. This may be accomplished with thin film filters (TFFs) tuned to different wavelengths, and mirrors deflecting optical signals down to near-normal incidence on the chip while allowing other wavelength signals to pass through. These are shown further with respect to FIGS. 2-5.

Figure 2:
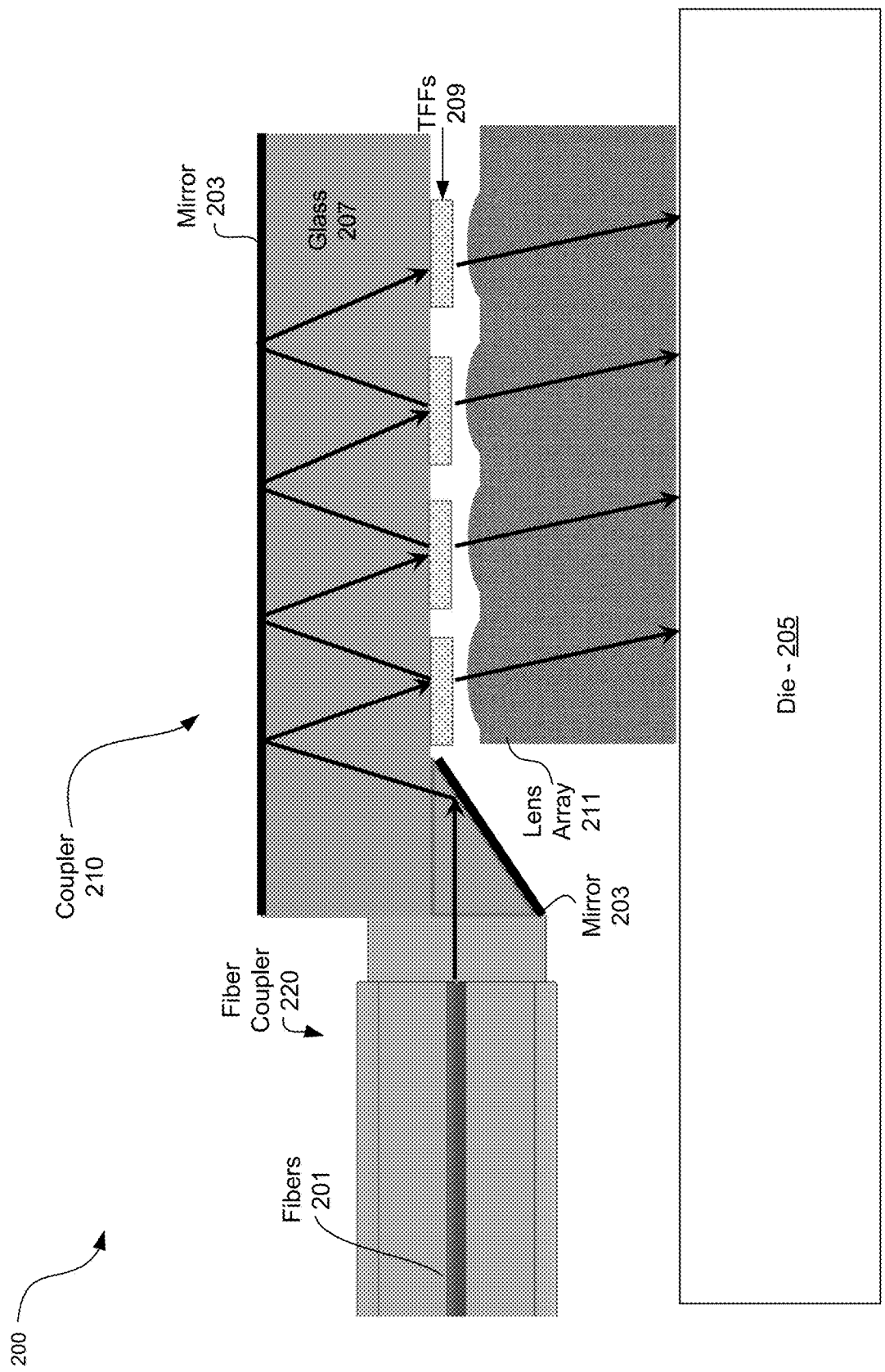
FIG. 2 is a schematic illustrating thin film filters with a launching filter, in accordance with an embodiment of the disclosure.

FIG. 2 is a schematic illustrating thin film filters with a launching filter, in accordance with an embodiment of the disclosure. Referring to FIG. 2, there is shown a transceiver 200 with optical signals coupled via fibers 201 and a coupler 210. The coupler 210 comprises mirrors 203, glass 207, thin film filters (TFFs) 209, and a lens array 211. The coupler 210 may be configured to direct optical signals into photonics die 205 at near-normal incidence.

The fibers 201 may comprise one or more optical fibers for coupling optical signals to and from the coupler 210 and photonics die 205 and may be within the fiber coupler 220, which may comprise lenses, filters, or polarization controlling components. For example, the fiber coupler 220 may comprise a lens for focusing the optical signals from the fibers 201 onto the mirror 203, or focus signals from the mirror 203 to the fibers 203. In another example, the fiber coupler 220 may comprise polarization splitting components to spatially separate signals of different polarizations before reflecting off the mirror 203. The fibers may comprise single mode or multi-mode fiber. In an example scenario, one fiber is used to couple signals into the coupler 210 and subsequently to the photonics die 205, while a second fiber receives optical signals from the photonics die via the coupler 210.

The glass 207 may comprise a machined and/or polished highly transparent structure on which optical components such as mirrors and filters may be formed. For example, one or more layers of a highly reflective metal, such as gold, for example, may be deposited on highly polished surfaces of the glass 207, thereby forming mirror 203. Similarly, filter structures may be formed by depositing stacks of dielectric layers on the glass 207, thereby forming the TFFs 209, for example. Accordingly, the glass 207 may guide optical signals from the fiber 201 end to the TFF 209 end, and vice versa.

The lens array 211 may comprise a micro-machined silicon structure, for example, with lens structures formed therein that are operable to focus optical signals received from the TFFs 209 to specific spots on the photonics die 205, such as grating couplers. While convex lensing structures are shown, other shapes may be utilized depending on desired focal length, the dielectric constant of the lens material used, and space requirements, for example.

The TFFs 209 may comprise stacks of alternating dielectric constant materials resulting in structures that are reflective at most wavelengths but allow light of specific wavelengths to pass through. Each of the TFFs 209 may be tuned to different wavelengths, which may be useful for CWDM applications. While four TFFs 209 are shown in FIG. 2, any number of TFFs may be used depending on the number of desired different wavelengths.

The mirrors 203 may comprise a high reflective material, such as a metal, formed on the glass 207, for directing the optical signals to the TFFs 209 from the fibers 201. The fibers 201 may comprise collimators at their outputs for providing collimated beams to the coupler 210.

In operation, optical signals may be coupled into the coupler 210 via the fibers 201 and reflected by the mirrors 203 and TFFs 209, resulting in a multi-reflection configuration. The TFFs 209 are each configured to reflect all signals except for those in a specific wavelength range. In this manner, specific wavelength optical signals may be coupled to specific locations on the photonics die 205, preferably to grating couplers tuned to the specific wavelength. The mirrors 203 enable an essentially vertical impingement on the TFFs 209, so that further reflecting structures are not needed after the TFFs 209 for desired near-normal incidence on the photonics die 205, thereby maximizing the coupling efficiency of optical signals in to the photonics die 205.

Figure 3:
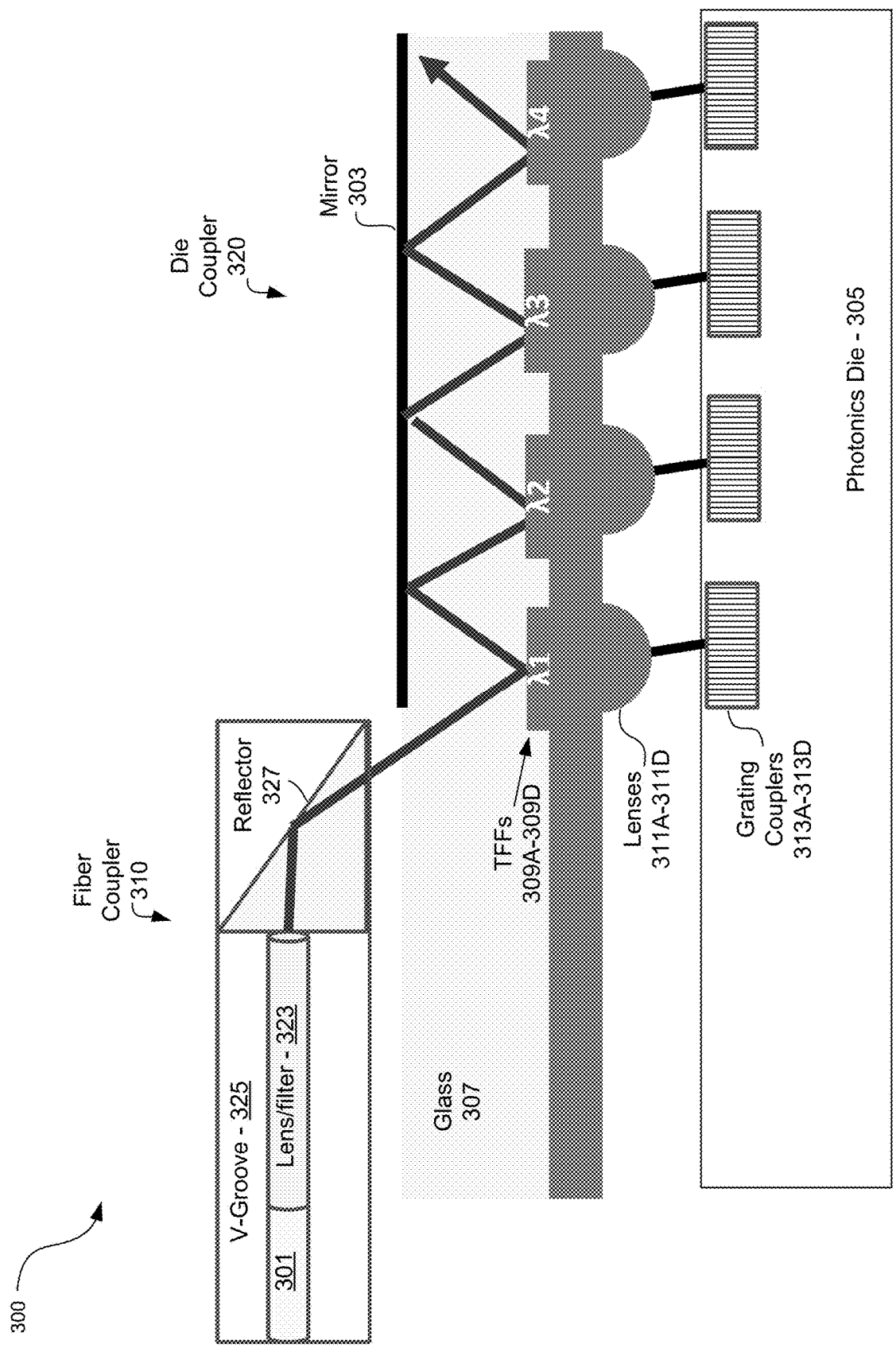
FIG. 3 is a schematic illustrating thin film filters integrated with collimating lenses, in accordance with an embodiment of the disclosure.

FIG. 3 is a schematic illustrating thin film filters integrated with collimating lenses, in accordance with an embodiment of the disclosure. Referring to FIG. 3, there is shown a transceiver 300 with optical signals coupled fiber coupler 310 and die coupler 320. The fiber coupler 310 comprises a lens 323, a V-groove 325, and a reflector 327. In an example scenario, the fiber coupler 310 comprises two-fiber V-grooves for aligning two fibers 301 (with only one shown in the cross-section of FIG. 3). The fiber coupler 320 may also comprise polarization controlling components. For example, the fiber coupler 310 may comprise a lens/filter 323 for focusing the optical signals from the fibers 301 onto the reflector 327, or focus signals from the reflector 327 to the fibers 301. In another example, the lens/filter 323 in the fiber coupler 320 may comprise polarization splitting components to spatially separate signals of different polarizations before reflecting off the reflector 327.

In another example, the lens 323 may comprise a graded index (GRIN) lens, for example, for focusing optical signals from the fiber 301 onto the reflector 327 so that reflected signals impinge on the desired TFF 309A-309D, and also for focusing signals received from the photonics die 305 via the die coupler 320 into the fibers 301. The reflector 327 may comprise highly reflective material, such as a metal, to direct optical signals from the fiber 301 onto the first of the TFFs 309A-309D, resulting in a multi-reflection configuration.

The die coupler 320 comprises glass 307 with mirror 303, thin film filters (TFFs) 309A-309D, and a lens array 311 formed thereon. The mirror 303 may be formed by depositing a highly reflective metal on the top surface of the glass 307 and may extend the length of the grating couplers 313A-313D in the photonics die 305 to allow for multiple reflections.

The TFFs 309A-309D are each configured to reflect all optical signals except for those in a specific wavelength range. In this manner, specific wavelength optical signals may be coupled to corresponding grating couplers 313A-313D on photonics die 305, tuned to a specific wavelength for that grating coupler. The mirror 303 and TFFs 309A-309D enable an essentially vertical impingement on the TFFs 309A-309D, so that further reflecting structures are not needed after the TFFs 309A-309D for desired near-normal incidence on the grating couplers 313A-313D on the photonics die 305.

The lenses 311A-311D may comprise a micro-machined silicon structure, for example, that is operable to focus optical signals received from the TFFs 309A-309D to specific grating couplers 313A-313D, and also to focus optical signals from the photonics die 305 onto the TFFs 309A-309D. The TFFs 309A-309D and lenses 311A-311D may be formed and/or machined on the same structure. While convex lensing structures are shown, other shapes may be utilized depending on desired focal length, the dielectric constant of the lens material used, and space requirements, for example.

The TFFs 309A-309D may comprise stacks of alternating dielectric constant materials resulting in structures that are reflective at most wavelengths but allow light of specific wavelengths to pass through. Each of the TFFs 309A-309D may be tuned to different wavelengths, which may be useful for CWDM applications. While four TFFs 309A-309D are shown in FIG. 3, any number of TFFs may be used depending on the number of desired different wavelengths.

In an example scenario, the TFFs 309A-309D and lens array 311 subassembly may first be precision attached to the photonics die 305, followed by the fiber coupler 310 being active aligned to the TFF 309A-309D and lenses 311A-311D subassembly.

In operation, a CWDM4 optical signal may be coupled into the fiber coupler 310 via the fibers 301 and directed by the reflector 327 down to the first TFF 309A, where the optical signal with the wavelength that corresponds to TFF 309A will pass through to the lens 311A, while all other optical signals reflect up to the mirror 303. The reflected signals are again reflected down by the mirror 303, but to the second TFF 309B where a second wavelength optical signal passes through while the remaining signals are reflected to the mirror 303. This continues until the last remaining optical signal passes through the last TFF 309D and lens 311D to the last grating coupler 313D. In this manner, a CWDM signal may be demultiplexed and processed individually by the photonic and electronic circuitry in the photonics die, as described previously with respect to FIG. 1, for example.

In this manner, specific wavelength optical signals may be coupled to specific locations on the photonics die 305, to grating couplers tuned to the specific wavelength. The mirror 303 enables an essentially vertical impingement on the TFFs 309A-309D, so that further reflecting structures are not needed after the TFF 309D for desired near-normal incidence on the photonics die 305, thereby maximizing the coupling efficiency of optical signals in to the photonics die 305.

Figure 4:
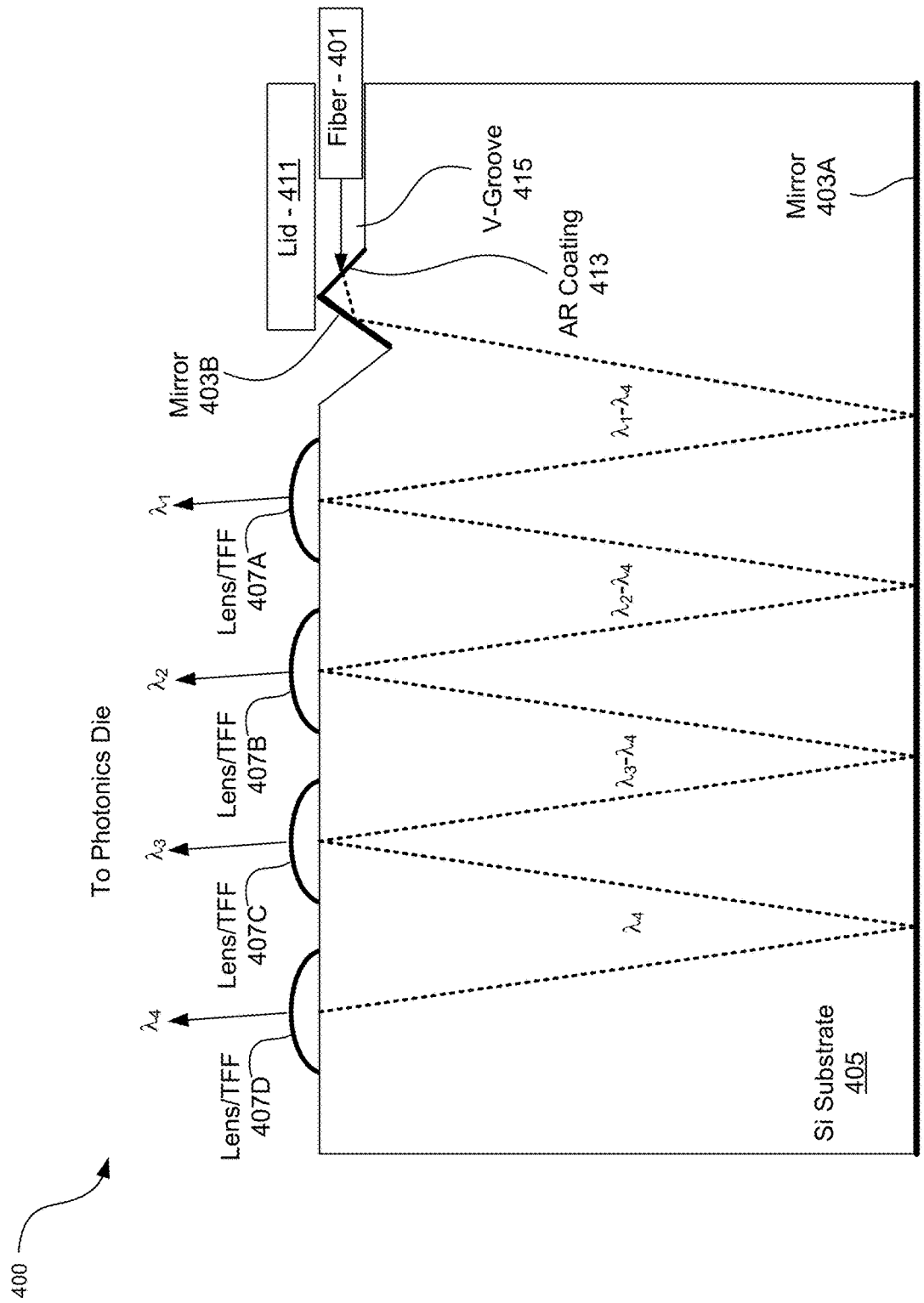
FIG. 4 illustrates an integrated MUX/DEMUX with lenses integrated on silicon, in accordance with an example embodiment of the disclosure.

FIG. 4 illustrates an integrated MUX/DEMUX with lenses integrated on silicon, in accordance with an example embodiment of the disclosure. Referring to FIG. 4, there is shown a MUX/DEMUX 400 formed in a silicon substrate 405 with lenses/TFFs 407A-407D formed on one surface and a back-side mirror 403A formed on the opposite side. The lenses/TFFs 407A-407D may comprise lenses incorporated with TFFs, in that stacks of dielectric layers for TFFs may be deposited on lenses formed in the silicon substrate 405, for example. In another example embodiment, the lenses may be deposited on the Si substrate 405 and then dielectric stacks may then be formed on the lenses. The dielectric stacks may be configured such that only optical signals of a desired wavelength pass through to be focused by each lens.

The fiber 401 may comprise a single mode or multi-mode fiber that may be placed in a V-groove 415 formed in the Si substrate 405 for proper alignment. The lid 411 may comprise physical support and hermetic sealing, for example, for the optical end of fiber 401. The V-groove 415 may be formed in the silicon with an angled surface for receiving optical signals from the fiber 401, where the angled surface may comprise an anti-reflection (AR) coating 413 to reduce or eliminate unwanted reflections back into the fiber 401. In an example scenario, the V-groove 415 and mirror angled surface may be formed in the same etch step, using potassium hydroxide (KOH), for example, which would give a degree of self-alignment. Using such an etch, which follows crystal planes, may enable exceptionally tight angle control. In this manner, the various planes of the mirrors and V-groove are defined by crystallographic axes of the silicon. An opposite surface to the AR coating 413 may be coated with a highly reflective metal to form mirror 403B.

The arrangement of the AR coating, mirrors 403A and 403B, and lenses/TFFs 407A-407D enable a multi-reflection configuration, where at each lens/TFF 407A-407D most wavelengths are reflected while only a desired wavelength is transmitted through the lens/TFF 407A-407D to a coupler on a photonics die. Utilizing a silicon substrate for the MUX/DEMUX 400 may enable tight thickness and coplanarity control for the multi-reflection configuration. In an example scenario, the Si substrate 405 may be ~1.5 mm thick and the angle of reflection at the backside mirror 403A may be ~12.8 degrees, in that an incoming optical signal is at 6.4 degrees from normal incidence.

In operation, a CWDM4 optical signal may be coupled into the MUX/DEMUX 400 via the fiber 401 and angled slightly downward by the change of index of refraction of the Si substrate 405, before being reflected downward by the mirror 403B to the backside mirror 403A. The angle of the mirror 403B may be configured such that the reflection of the optical beam is such that it is centered on the lens/TFF 407A when reflected back upward by the backside mirror 403A. In an example scenario, the angle of the mirror 403B may be defined by crystalline planes of the silicon, formed by anisotropic etching, for example, thereby enabling very tight distribution of this angle. At the lens/TFF 407A, a first wavelength optical signal, $\lambda_1$ in this example, passes through while the remaining wavelength optical signals are reflected back downward to the backside mirror 403A. The optical signal at wavelength $\lambda_1$ may be coupled to a photonics die coupled to the MUX/DEMUX 400.

After being reflected by the lens/TFF 407A, the optical signal thus comprises signals of wavelengths $\lambda_2$-$\lambda_4$, as indicated in FIG. 4 at the second reflection at the backside mirror 403A. This signal then reaches the lens/TFF 407B where the $\lambda_2$ wavelength optical signal passes through while the $\lambda_3$ and $\lambda_4$ wavelength signals are reflected back to the backside mirror 403A. This reflection and transmission continues until each optical signal is communicated through one of the lenses/TFFs 407A-407D, demonstrating a CWDM4 demultiplexer. Although a four wavelength DEMUX is shown in FIG. 4, any number of wavelengths may be demultiplexed based on the number of lenses/TFFs incorporated in the structure.

In addition, the MUX/DEMUX 400 may multiplex signals by essentially operating in the reverse direction to that described above. In this case, optical signals of four different wavelengths may be received from a photonic chip, pass through the corresponding lens/TFF 407A-407D and be reflected by the backside mirror 403A. As the next lens/TFF is tuned to a different wavelength, each signal will thus be reflected by the other lenses/TFFs 407A-407D to the backside mirror 403A consecutively until reaching the mirror 403B and AR coating 413, before being coupled into the fiber 401, thereby generating a CWDM4 signal.

Figure 5:
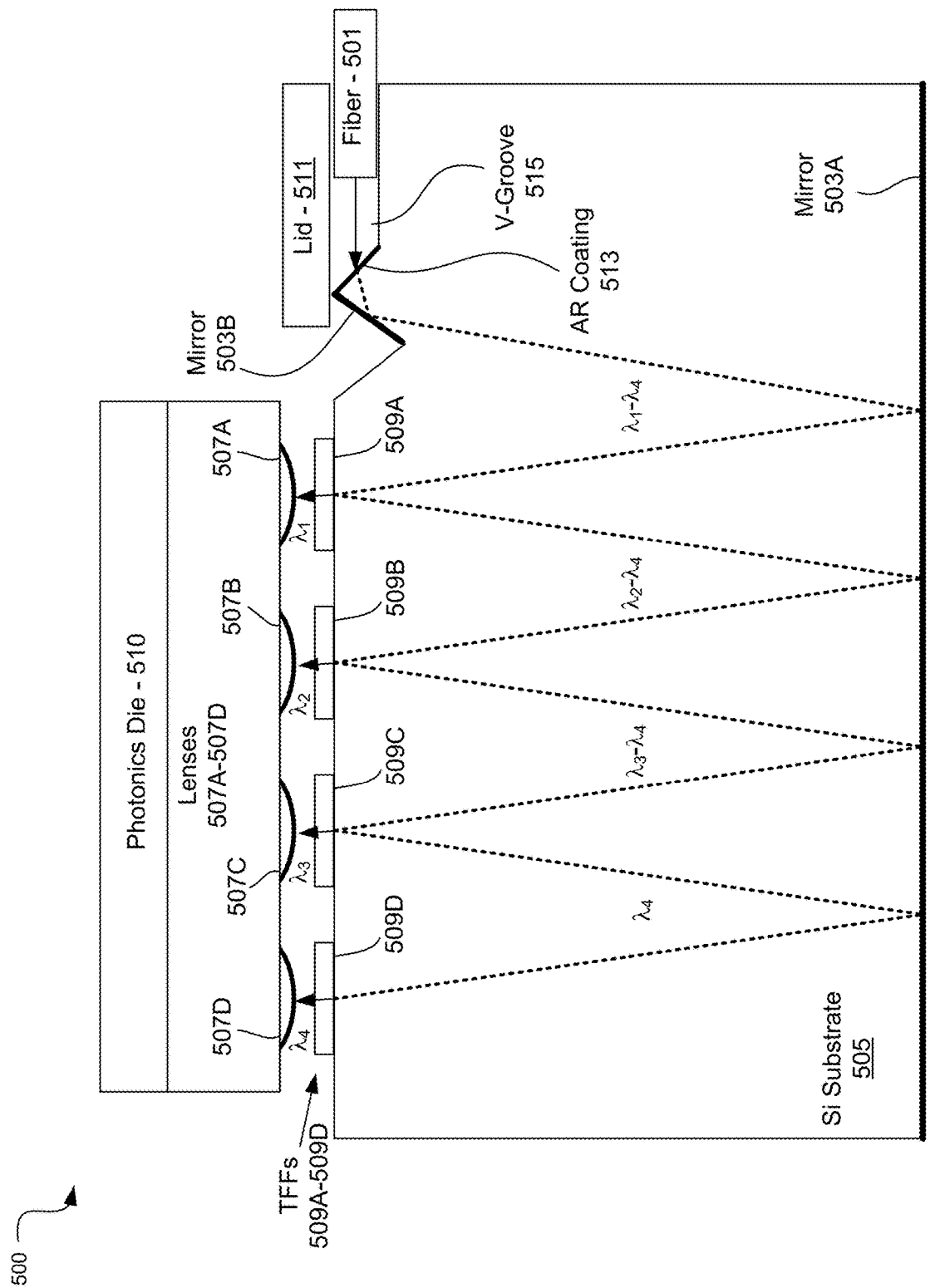
FIG. 5 illustrates an integrated MUX/DEMUX with thin film filters integrated on silicon and coupled to a lens array and photonics die, in accordance with an example embodiment of the disclosure.

FIG. 5 illustrates an integrated MUX/DEMUX with thin film filters integrated on silicon and coupled to a lens array and photonics die, in accordance with an example embodiment of the disclosure. Referring to FIG. 5, there is shown a MUX/DEMUX 500 formed in a silicon substrate 505 with TFFs 509A-509D formed on one surface and a back-side mirror 503A formed on the opposite side. The TFFs 509A-509D may comprise dielectric stacks that may be configured such that only optical signals of a desired wavelength pass through while reflecting other optical wavelengths.

The lenses 507A-507D may comprise lenses formed in or on a silicon substrate and may be operable to focus received signals onto corresponding grating couplers in the photonics die 510. In addition, the lenses 507A-507D may be operable to focus optical signals received from grating couplers in the photonics die 510 to the TFFs 509A-509D.

The fiber 501 may comprise a single mode or multi-mode fiber that may be placed in a V-groove 515 formed in the Si substrate 505 for proper alignment. The lid 511 may comprise physical support and hermetic sealing, for example, for the optical end of fiber 501. The V-groove 515 may be formed in the silicon with an angled surface for receiving optical signals from the fiber 501, where the angled surface may comprise an anti-reflection (AR) coating 513 to reduce or eliminate unwanted reflections back into the fiber 501. In an example scenario, the V-groove 515 and mirror angled surface may be formed in the same etch step, using potassium hydroxide (KOH), for example, which would give a degree of self-alignment. Using such an etch, which follows crystal planes, may enable exceptionally tight angle control. In this manner, the various planes of the mirrors and V-groove are defined by crystallographic axes of the silicon. An opposite surface to the AR coating 513 may be coated with a highly reflective metal to form mirror 503B.

The arrangement of the AR coating, mirrors 503A and 503B, and TFFs 509A-509D enable a multi-reflection configuration, where at each TFF 509A-509D most wavelengths are reflected while only a desired wavelength is transmitted through the TFF 509A-509D to a corresponding lens 507A-507D before being coupled to the photonics die 510. Utilizing silicon substrates for the MUX/DEMUX 500 may enable tight thickness and coplanarity control for the multi-reflection configuration. In an example scenario, the Si substrate 505 may be ~1.5 mm thick and the angle of reflection at the backside mirror 403A may be ~12.8 degrees, in that an incoming optical signal is at 6.4 degrees from normal incidence.

In operation, a CWDM4 optical signal may be coupled into the MUX/DEMUX 500 via the fiber 501 and angled slightly downward by the change of index of refraction of the Si substrate 505, before being reflected downward by the mirror 503B to the backside mirror 503A. The angle of the mirror 503B may be configured such that the reflection of the optical beam is such that it is centered on the TFF 509A when reflected back upward by the backside mirror 503A. In an example scenario, the angle of the mirror 503B may be defined by crystalline planes of the silicon, formed by anisotropic etching, for example, thereby enabling very tight distribution of this angle. At the TFF 509A, a first wavelength optical signal, $\lambda_1$ in this example, passes through while the remaining wavelength optical signals are reflected back downward to the backside mirror 503A. The optical signal at wavelength $\lambda_1$ may be focused by the lens 507A to be coupled to the photonics die 510.

After being reflected by the TFF 509A, the optical signal thus comprises signals of wavelengths $\lambda_2$-$\lambda_4$, as indicated in FIG. 5 at the second reflection at the backside mirror 503A. This signal then reaches the TFF 509B where the $\lambda_2$ wavelength optical signal passes through while the $\lambda_3$ and $\lambda_4$ wavelength signals are reflected back to the backside mirror 503A. This reflection and transmission continues until each optical signal is communicated through one of the TFFs 509A-509D, demonstrating a CWDM4 demultiplexer. Although a four wavelength DEMUX is shown in FIG. 5, any number of wavelengths may be demultiplexed based on the number of lenses and TFFs incorporated in the structure.

In addition, the MUX/DEMUX 500 may multiplex signals by essentially operating in the reverse direction to that described above. In this case, optical signals of four different wavelengths may be received from the photonics die 510, pass through the corresponding lens 507A-507D and TFF 509A-509D and be reflected by the backside mirror 503A. As the next TFF is tuned to a different wavelength, each signal will thus be reflected by the other TFFs 509A-509C to the backside mirror 503A consecutively until reaching the mirror 503B and AR coating 513, before being coupled into the fiber 501, thereby generating a CWDM4 signal.

In an example embodiment of the disclosure, a method and system is described for near normal incidence MUX/DEMUX designs. The system may comprise an optical demultiplexer coupled to a photonics die, where the demultiplexer comprises an input fiber, a plurality of thin film filters at a first surface of a substrate, a first mirror at the first surface of the substrate, and a second mirror at a second surface of the substrate opposite to the first surface.

The optical demultiplexer may be operable to receive an input optical signal comprising a plurality of wavelength optical signals, reflect the input optical signal from the first mirror to the second mirror, reflect the input optical signal from the second mirror to a first of the plurality of thin film filters, communicate an optical signal at a first wavelength of the plurality of wavelength optical signals to the photonics die while reflecting others of the plurality of wavelength optical signals to the second mirror, reflect the others of the plurality of wavelength optical signals to a second of the plurality of thin film filters, and communicate an optical signal at a second wavelength of the plurality of wavelength optical signals to the photonics die.

The optical demultiplexer may reflect the others of the plurality of wavelength optical signals off the thin film filters and the second mirror until a single wavelength optical signal remains and is communicated through a last of the plurality of thin film filters to the photonics die. The substrate may comprise glass or silicon. The optical fiber may be in a V-groove formed in the silicon substrate. The optical demultiplexer may be operable to communicate the optical signals at the first and second wavelengths to the photonics die through focusing lenses. The optical demultiplexer may be operable to focus the optical signals at the first and second wavelengths on grating couplers in the photonics die using the focusing lenses.

In an example embodiment of the disclosure, a method and system is described for near normal incidence MUX/DEMUX designs. The system may comprise an optical multiplexer coupled to a photonics die, where the multiplexer comprises an output optical fiber, a plurality of thin film filters at a first surface of a substrate, a first mirror at the first surface of the substrate, and a second mirror at a second surface of the substrate opposite to the first surface. The optical multiplexer is operable to receive a plurality of input optical signals each at a different wavelength from the photonics die, transmitting each of the plurality of input optical signals through a corresponding thin film filter of the plurality of thin film filters into the substrate, consecutively reflect the transmitted plurality of input optical signals off the second mirror and a subset of the thin film filters until each input optical signal is reflected to the first mirror, and communicate a multiplexed optical signal comprising the plurality of input optical signals from the first mirror into the output optical fiber.

The substrate may comprise glass or silicon, where the output optical fiber may be in a V-groove formed in the silicon substrate. The optical multiplexer may be operable to communicate each of the received plurality of input optical signals through focusing lenses. The focusing lenses may focus the plurality of input optical signals onto a corresponding one of the plurality of thin film filters. A lens may be coupled to the input fiber. The first mirror and the V-groove may be defined by crystallographic axes of the silicon substrate.

While the present disclosure has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
reflecting an input optical signal comprising a plurality of wavelengths via a v-groove reflector through a first surface of a substrate to a first thin film filter of a plurality of thin film filters that are located on a second surface of the substrate opposite to the first surface, wherein a first angled surface of the v-groove reflector is disposed in a non-perpendicular plane to a direction of travel for the input optical signal from an optical fiber and a second angled surface of the v-groove reflector redirects the input optical signal received from the first angled surface to the second surface of the substrate;
communicating a first optical signal of a first wavelength of the plurality of wavelengths to a photonics die connected to the second surface;
reflecting a second optical signal of a second wavelength of the plurality of wavelengths from the first thin film filter to a mirror defined on the first surface which reflects the second optical signal to a second thin film filter of the plurality of thin film filters, wherein the second angled surface reflects optical signals at 6.4 degrees from normal incidence to the mirror; and
communicating the second optical signal to the photonics die.

2. The method according to claim 1, comprising reflecting others of the plurality of wavelengths via plurality of thin film filters and the mirror until a single wavelength remains and is communicated through a last of the plurality of thin film filters to the photonics die.

3. The method according to claim 1, wherein the substrate comprises glass.

4. The method according to claim 1, wherein a lens is coupled to an input fiber carrying the input optical signals to the v-groove reflector.

5. The method according to claim 4, wherein the substrate comprises silicon.

6. The method according to claim 1, comprising communicating the first and second optical signals at the first and second wavelengths to the photonics die through focusing lenses.

7. The method according to claim 6, comprising focusing the first and second optical signals at the first and second wavelengths on grating couplers in the photonics die using the focusing lenses.

8. The method of claim 1, wherein the first angled surface includes an anti-reflection coating and the second angled surface includes a metallic mirrored surface.

9. The method of claim 1, wherein a relative angle of the first angled surface to the second angled surface is formed based on crystallographic axes of the substrate.

10. A system comprising:
an optical demultiplexer comprising an input fiber connected to a first surface via a v-groove reflector, a plurality of thin film filters at a second surface of a substrate opposite to the first surface, and a mirror at the first surface of the substrate, wherein a first angled surface of the v-groove reflector is disposed in a non-perpendicular plane to a direction of travel for the input fiber and a second angled surface of the v-groove reflector redirects an input optical signal received from the first angled surface to the second surface of the substrate, wherein the second angled surface reflects optical signals at 6.4 degrees from normal incidence to the mirror, the optical demultiplexer being operable to:
reflect the input optical signal comprising a plurality of wavelength optical signals from the v-groove reflector to a first thin film filter of the plurality of thin film filters;
communicate an optical signal at a first wavelength of the plurality of wavelength optical signals to a top surface of a photonics die connected to the second surface while reflecting others of the plurality of wavelength optical signals to the mirror from the first thin film filter;
reflect the others of the plurality of wavelength optical signals to a second thin film filter of the plurality of thin film filters; and
communicate an optical signal at a second wavelength of the plurality of wavelength optical signals to the top surface of the photonics die.

11. The system according to claim 10, wherein the optical demultiplexer is operable to reflect the others of the plurality of wavelength optical signals via the plurality of thin film filters and the mirror until a single wavelength optical signal remains and is communicated through a last thin film filter of the plurality of thin film filters to the photonics die.

12. The system according to claim 10, wherein the substrate comprises glass.

13. The system according to claim 10, wherein a lens is coupled to the input fiber.

14. The system according to claim 10, wherein the substrate comprises silicon.

15. The system according to claim 10, wherein the optical demultiplexer is operable to communicate the wavelength optical signals at the first and second wavelengths to the photonics die through focusing lenses.

16. The system according to claim 15, wherein the optical demultiplexer is operable to focus the wavelength optical signals at the first and second wavelengths on grating couplers in the photonics die using the focusing lenses.

17. A system comprising:
an optical multiplexer coupled to a photonics die, the optical multiplexer comprising:
an output optical fiber connected to a first surface of a substrate via a v-groove reflector, having a first angled surface and a second angled surface
a plurality of thin film filters at a second surface of the substrate opposite to the first surface,
a mirror at the first surface of the substrate, the optical multiplexer being operable to:
receive a plurality of input optical signals each at a different wavelength from the photonics die via corresponding thin film filters of the plurality of thin film filters;
communicate a first optical signal of the plurality of input optical signals from a first thin filter to the mirror;
reflect the first optical signal from the mirror to a second thin film filter of the plurality of thin film filters;
communicate the first optical signal and a second optical signal of the plurality of input optical signals via the second thin film filter to the second surface of the v-groove reflector;

redirect the multiplexed optical signal from the second angled surface to the first angled surface; and communicate a multiplexed optical signal comprising the first optical signal and the second optical signal from the first angled surface of the v-groove reflector into the output optical fiber;

wherein the second angled surface reflects optical signals at 6.4 degrees from normal incidence to the mirror; and wherein the first angled surface of the v-groove reflector is disposed in a non-perpendicular plane to a direction of travel for the multiplexed optical signal in the output optical fiber.

18. The system according to claim 17, wherein the substrate comprises glass.

19. The system according to claim 17, wherein a lens is coupled to the output optical fiber.

20. The system according to claim 17, wherein the substrate comprises silicon.

21. The system according to claim 17, wherein the optical multiplexer is operable to communicate each of the received plurality of input optical signals through focusing lenses.

22. The system according to claim 21, wherein the focusing lenses focus the plurality of input optical signals onto a corresponding one of the plurality of thin film filters.

\* \* \* \* \*